(12) United States Patent
Hsu et al.

(10) Patent No.: US 8,534,152 B2
(45) Date of Patent: Sep. 17, 2013

(54) DEFLECTOR FOR BALL SCREW

(75) Inventors: Po-Chuan Hsu, Taichung (TW); Yan-Yu Chen, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 251 days.

(21) Appl. No.: 13/016,623

(22) Filed: Jan. 28, 2011

(65) Prior Publication Data

US 2012/0192668 A1  Aug. 2, 2012

(51) Int. Cl.
*F16H 1/24* (2006.01)
*F16H 55/02* (2006.01)

(52) U.S. Cl.
USPC ..................................... 74/424.87; 74/424.86

(58) Field of Classification Search
USPC .................. 74/424.82, 0.83, 0.86, 0.87, 0.88, 74/0.89; 384/43, 45, 49
See application file for complete search history.

(56) References Cited

U.S. PATENT DOCUMENTS

| | | | |
|---|---|---|---|
| 5,993,064 A | 11/1999 | Teramachi | |
| 6,089,117 A * | 7/2000 | Ebina et al. | 74/424.87 |
| 7,476,031 B2 * | 1/2009 | Xu et al. | 384/45 |
| 2010/0050801 A1 * | 3/2010 | Kuo | 74/424.87 |
| 2010/0139433 A1 * | 6/2010 | Chen et al. | 74/424.87 |
| 2011/0023642 A1 * | 2/2011 | Hsu et al. | 74/424.88 |
| 2011/0120248 A1 * | 5/2011 | Chen | 74/424.88 |
| 2011/0154927 A1 * | 6/2011 | Chen et al. | 74/424.86 |

* cited by examiner

*Primary Examiner* — Justin Krause
(74) *Attorney, Agent, or Firm* — Muncy, Geissler, Olds & Lowe, PLLC

(57) ABSTRACT

A deflector for use in a ball screw is composed of a main body and a junction member connected with the main body to form a channel having a first guide groove and two second guide grooves formed at two opposite sides of the first guide groove. Each of the second guide grooves has two walls extending outward from the first guide groove. Each two of the walls have a conjunction formed therebetween. The vertical section of the channel can define an extending axis passing through centers of the two conjunctions. At least one of the walls of each second guide groove is not parallel to the extending axis. In light of the above features, the roller chain can avoid wear and tear to prolong its service life thereof. Besides, the mold for forming the deflector can be designed to be structurally subject to mold release, such that the production efficiency can be increased.

10 Claims, 10 Drawing Sheets

DEFLECTOR FOR BALL SCREW

BACKGROUND OF THE INVENTION

1. Field of the Invention

The present invention relates generally to a ball screw, and more particularly, to a deflector for a ball screw.

2. Description of the Related Art

The linear transmission device can allow the machine mounted thereon to definitely and precisely moved, so it is broadly applied to a variety of industries. The common linear transmission device includes ball screw, linear guideway, and linear motor system.

Taking the ball screw as an example, the ball screw includes a screw spindle having a thread formed on its external side, a screw nut sleeved onto the screw spindle, and a plurality of rolling members mounted between the screw spindle and the screw nut. The rolling members are moved synchronously circularly moved by a chain to allow the screw nut for smooth movement and rotation along the screw spindle via the rolling members.

U.S. Pat. No. 5,993,064 disclosed that a flexible ball connector 1 includes a plurality of balls 3 which can allow the ball connector 1 for curvature towards various directions while moving. As shown in FIG. 19 of the aforesaid patent, a nut member 152 further includes a return pipe 154, through which a connector belt 2 and the balls 3 pass and which has guide grooves 157 formed at internal walls thereof for guiding a belt members 5 of the connector belt 2 in such a way that the connector belt 2 and the balls 3 can be more smoothly circularly moved between the nut member 152 and a screw shaft 150. The guide grooves 157 of the return pipe 154 are symmetrically mounted to the internal walls of the return pipe 154 with respect to what a center of the return pipe 54 extends, such that the connector belt 2 can be moved along the guide grooves 157.

As the connector belt 2 is moved, it can twist along with its moving path to enable different deformation states of the belt members 5 in the guide grooves 157. However, the guide grooves 157 in the return pipe 154 have the same cross section, so the connector belt 2 fails to coordinate with the guide grooves 157 and the connector belt 2 is subject to excessive contact with the internal walls of the guide grooves 157. In this way, the belt members 5 and the guide grooves 157 have greater friction therebetween to result in wear and tear of the belt members 5 and reduction of the service life of the connector belt 2.

SUMMARY OF THE INVENTION

The primary objective of the present invention is to provide a deflector, which can prevent the roller chain from wear and tear, for use in a ball screw.

The secondary objective of the present invention is to provide a deflector, which can decrease production cost and increase production efficiency, for use in a ball screw.

The foregoing objectives of the present invention are attained by the deflector composed of a main body and a junction member. Each of the main body and the junction member includes a joint or commissure. The main body and the junction member are connected with each other along the joint and the commissure to form a channel having a first guide groove and two second guide grooves formed at two opposite sides of the first guide groove. Each of the second guide grooves has two walls extending outward from the first guide groove. Each two of the walls have a conjunction formed therebetween. The vertical section of the channel can define an extending axis passing through centers of the two conjunctions. At least one of the walls of each second guide groove is not parallel to the extending axis.

To actualize the technical features of the deflector, the ball screw is composed of a screw spindle and a screw nut. The screw spindle includes a spiral groove formed at an external periphery thereof. The screw nut includes a spiral groove formed at an internal periphery thereof and a positioning portion formed at an external periphery thereof. The screw nut is sleeved onto the screw spindle. The deflector is mounted to the positioning portion.

In light of the second guide groove, more space of deformation is available for the roller chain to reduce and prevent the roller chain from wear and tear, thus prolonging the service life of the roller chain. In the meantime, the mold for forming the deflector can be designed to be structurally subject to mold release, such that the production cost can be decreased and the production efficiency can be increased.

DETAILED DESCRIPTION OF PREFERRED EMBODIMENTS

Figure 1:
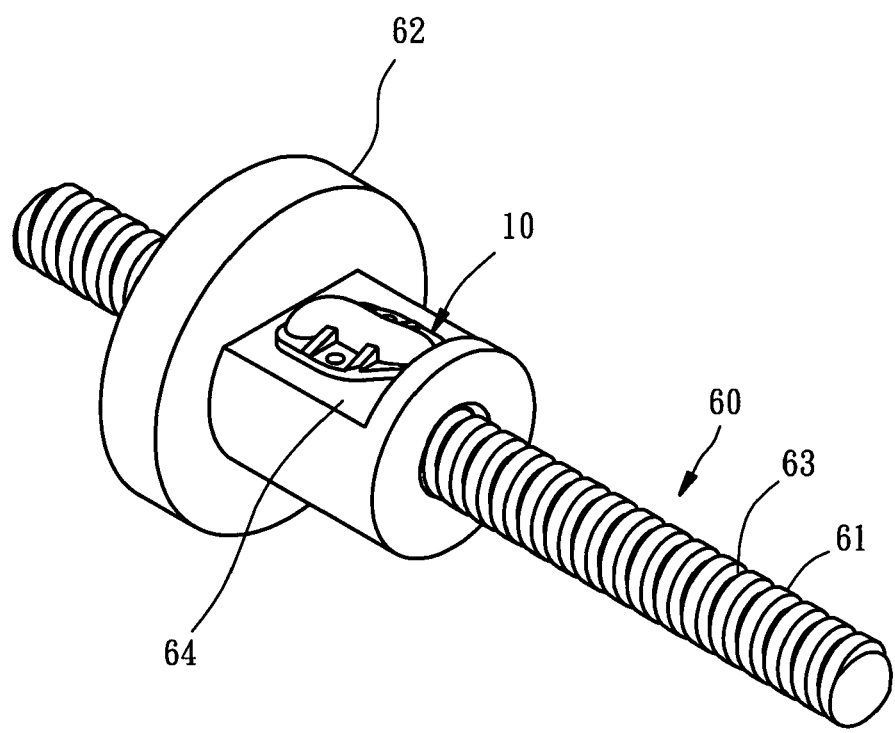
FIG. 1 is a perspective view of a first preferred embodiment of the present invention.
Figure 2:
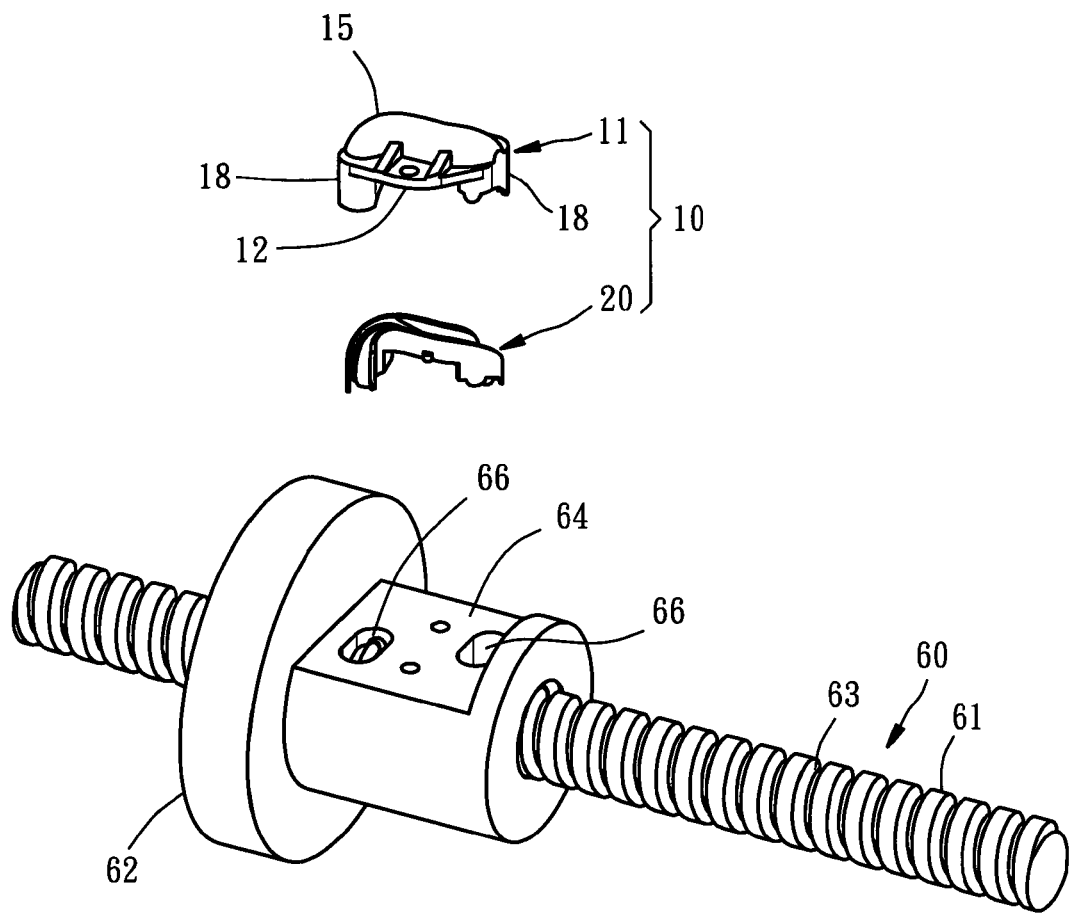
FIG. 2 is a partially exploded view of the first preferred embodiment of the present invention.
Figure 3:
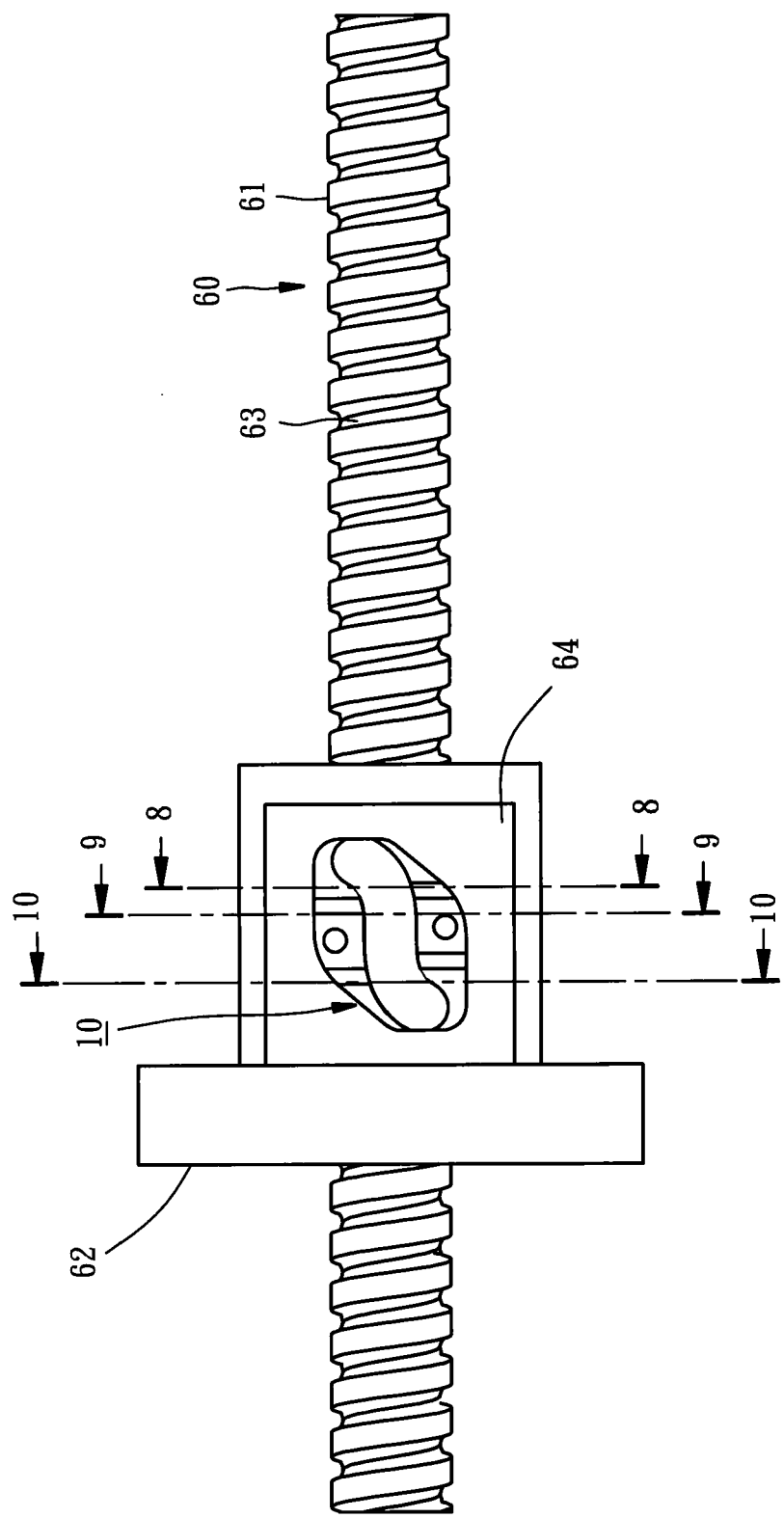
FIG. 3 is a top view of the first preferred embodiment of the present invention.
Figure 7:
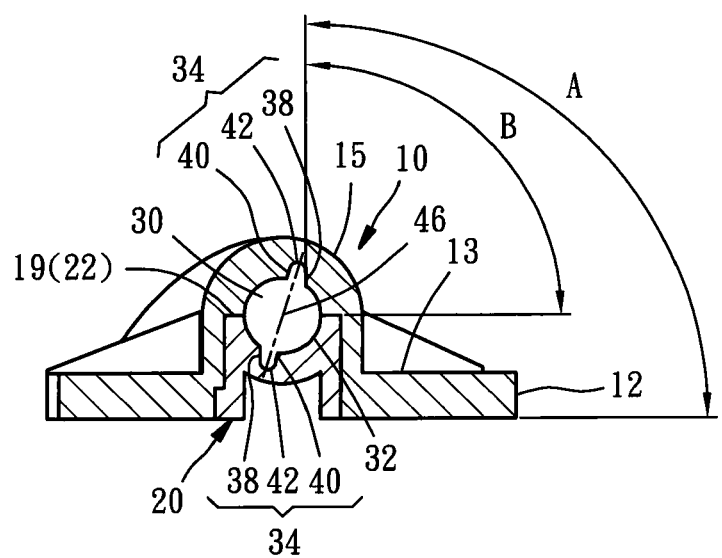
FIG. 7 is a sectional view of a part of the first preferred embodiment of the present invention, illustrating the deflector.

Referring to FIGS. 1-3, a deflector 10 for a ball screw 60 in accordance with a first preferred embodiment of the present invention is composed of a screw spindle 61 and a screw nut 62 sleeved onto the screw spindle 61. The screw spindle 61 includes a spiral groove 63 formed on an external periphery thereof. The screw nut 62 also includes a spiral groove formed at an internal periphery thereof for receiving a roller chain 50 which can synchronously drive a plurality of rolling members 52 to circularly roll between the screw spindle 61 and the screw nut 62, as shown in FIG. 7. As shown in FIG. 2, the screw nut 62 further has a positioning portion 64 formed at an external periphery thereof. Two through holes 66 run through the positioning portion 64 for communication with the screw nut 62.

Figure 4:
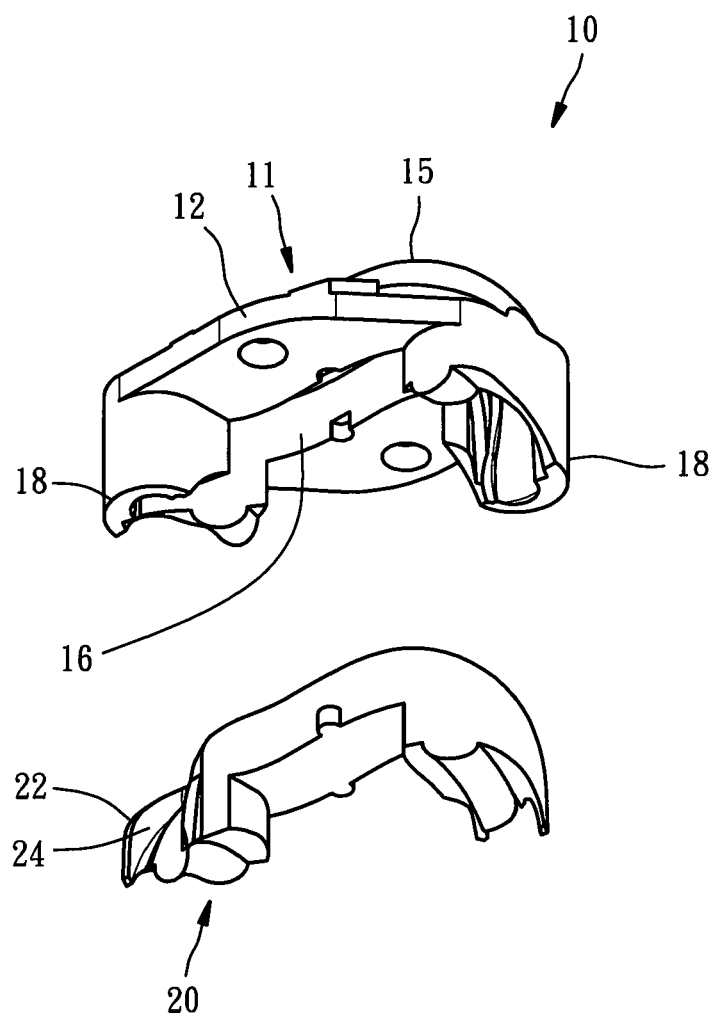
FIG. 4 is an exploded view of a part of the first preferred embodiment of the present invention, showing the bottom side of the deflector.
Figure 5:
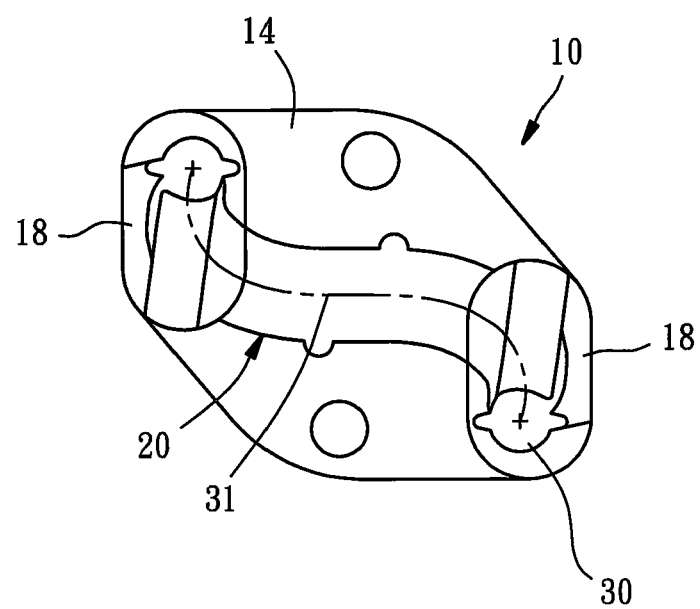
FIG. 5 is a bottom view of a part of the first preferred embodiment of the present invention, illustrating the deflector.
Figure 6:
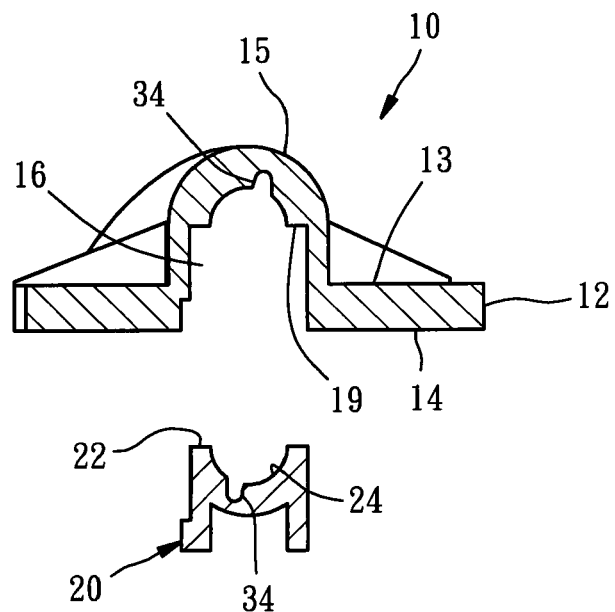
FIG. 6 is an exploded sectional view of a part of the first preferred embodiment of the present invention, illustrating the deflector.

As shown in FIGS. 2, 4 & 6, the deflector 10 is composed of a main body 11 and a junction member 20. The main body 11 includes a base 12, which has a curviform convex portion 15 formed on a top side 13 thereof. The base 12 has two support portions 18 formed at two opposite edges of a bottom side 14 thereof. A first cavity 16 is formed at the bottom side 14 of the base 12, abutting against the convex portion 15 and extending to the midst of two support portions 18 to form a joint 19.

Referring to FIGS. 6-7, the junction member 20 of the deflector 10 includes a commissure 22 having a second cavity 24. The junction member 20 can be fixedly mounted to the first cavity 16 in such a way that the commissure 22 is stopped against the joint 19 and a channel 30 is formed inside the deflector 10 and run through the deflector 10 along a return path 31. The deflector 10 is mounted to the screw nut 62 to enable the two support portions 18 to be fixedly mounted to the two through holes 66 separately; meanwhile, the channel 30 adjacent to the support portions 18 defines an imaginary central axis, which is tangential to an external peripheral wall of the spiral groove of the screw nut, and communicates with the spiral groove.

A first guide groove 32 is formed inside the deflector 10 and abuts against the channel 30 for the rolling members 52 to pass through. Two second guide grooves 34 are formed at two opposite sides of the first guide groove 32 separately for guiding two sides of the roller chain 50. Each of the second guide grooves 34 defines a first wall 38 and a second wall 40, both of which extend from the first guide groove 32. An arc-shaped conjunction 42 is formed between the first and second walls 38 and 40.

The section of the second guide grooves 34 is variable in shape subject to different positions of the return path 31. The vertical section of the channel 30 can define an extending axis 46 passing through centers of the conjunctions 42. The first wall 38 of each second groove 34 is inclined and not parallel to the extending axis 46. The second wall 40 of each second guide groove 34 is approximately parallel to the extending axis 46. Because the conjunctions 42 in this embodiment are arc-shaped, the extending axis 46 passes through the centers of the two conjunctions 42. If the conjunctions 42 in this embodiment are not arc-shaped, the extending axis 46 can be a midsection passing through the contours of the two conjunctions 42. An included angle A between the first wall 38 and the bottom side 14 is about 90 degrees. An included angle B between the first wall 38 and the joint 19 or the commissure 22 is 30-150 degrees and preferably 90 degrees. If each of the angles A and B is smaller than 30 degrees or more than 150 degrees, the ball screw will be subject to vibration and noise during the operation because the contact area between the joint 19 and the commissure 22 is too small.

Figure 8:
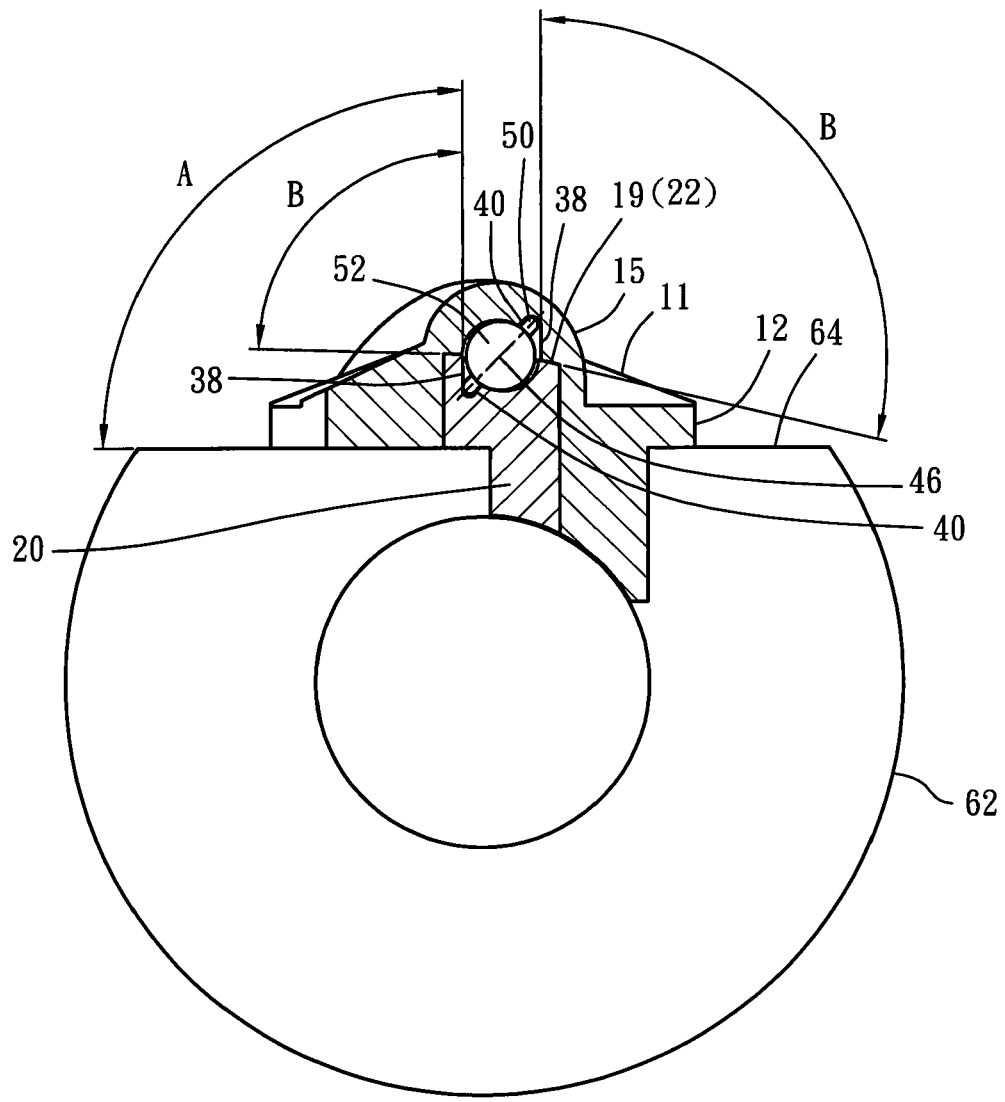
FIG. 8 is a sectional view taken from a line 8-8 indicated in FIG. 3, illustrating that the roller chain and the rolling members are located in the channel.
Figure 9:
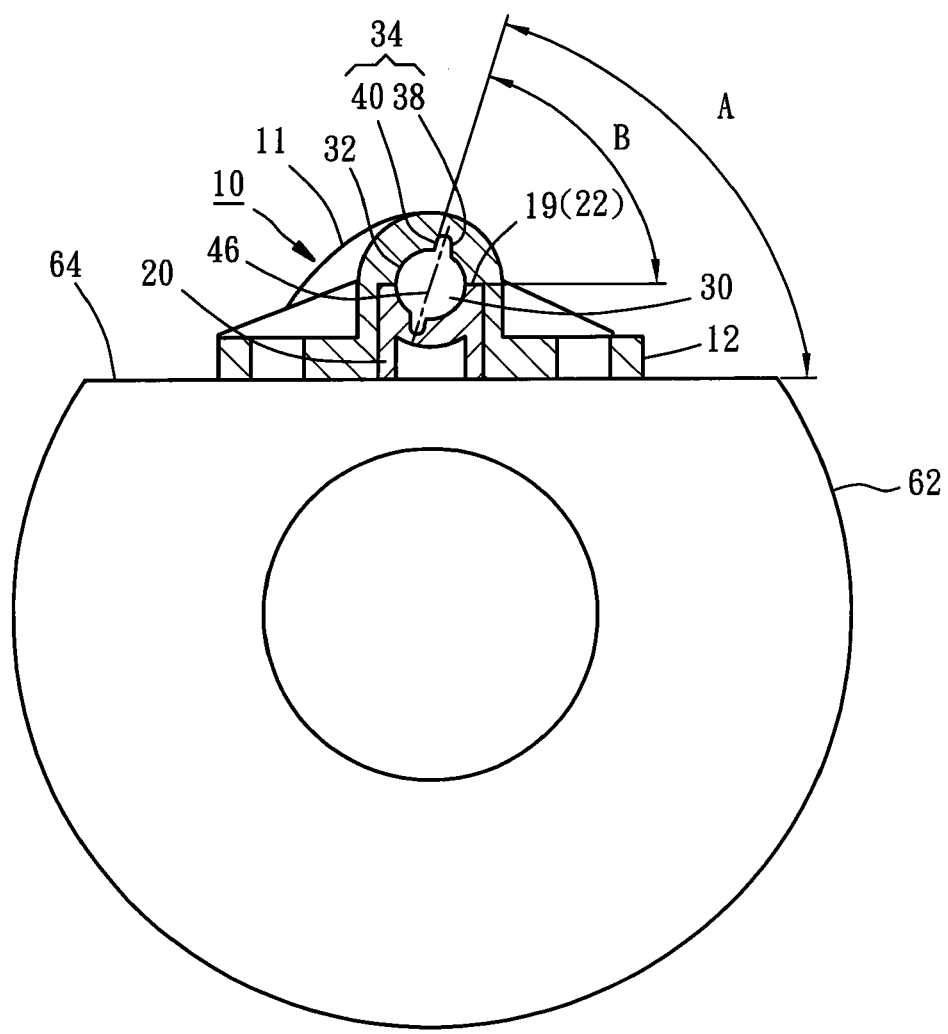
FIG. 9 is a sectional view taken from a line 9-9 indicated in FIG. 3.
Figure 10:
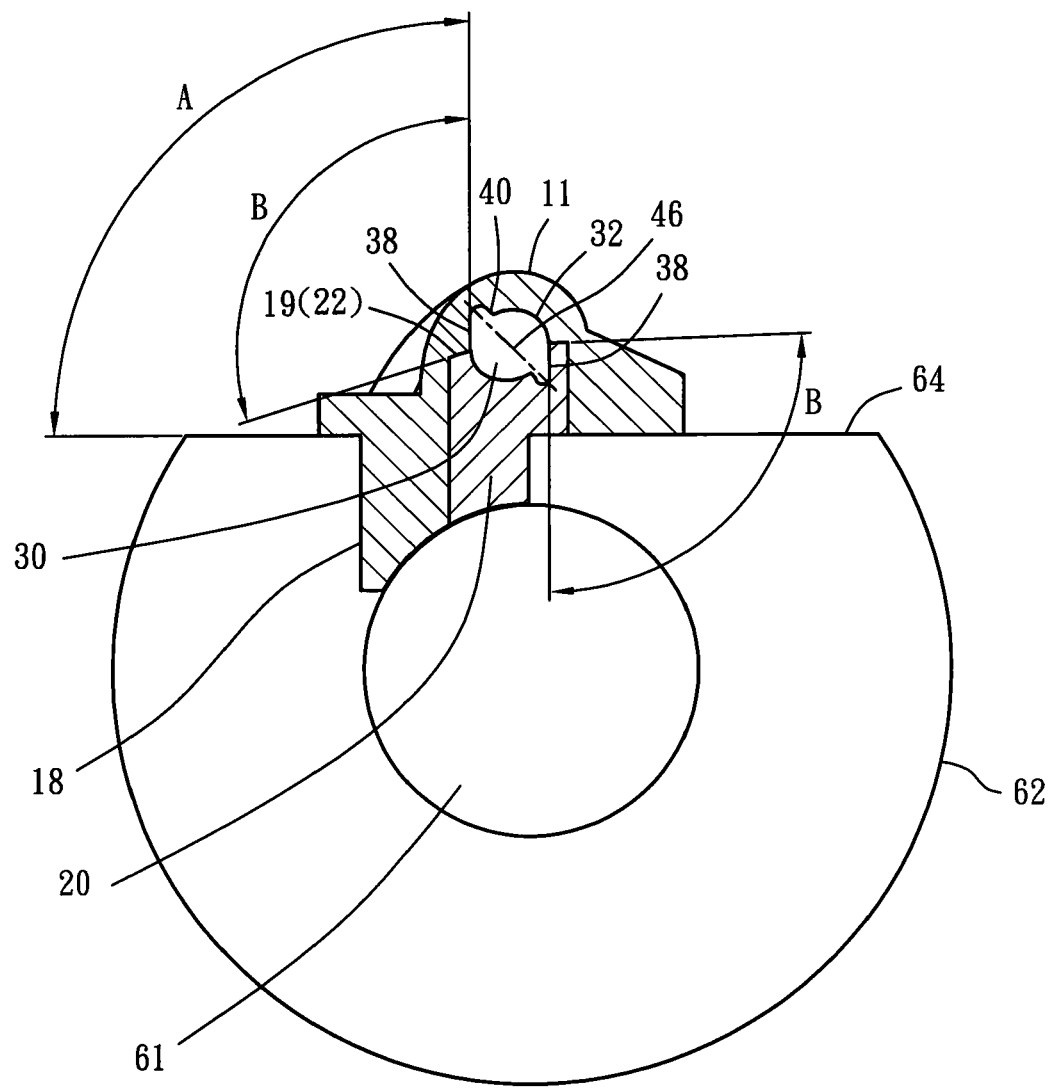
FIG. 10 is a sectional view taken from a line 10-10 indicated in FIG. 3.
Figure 11:
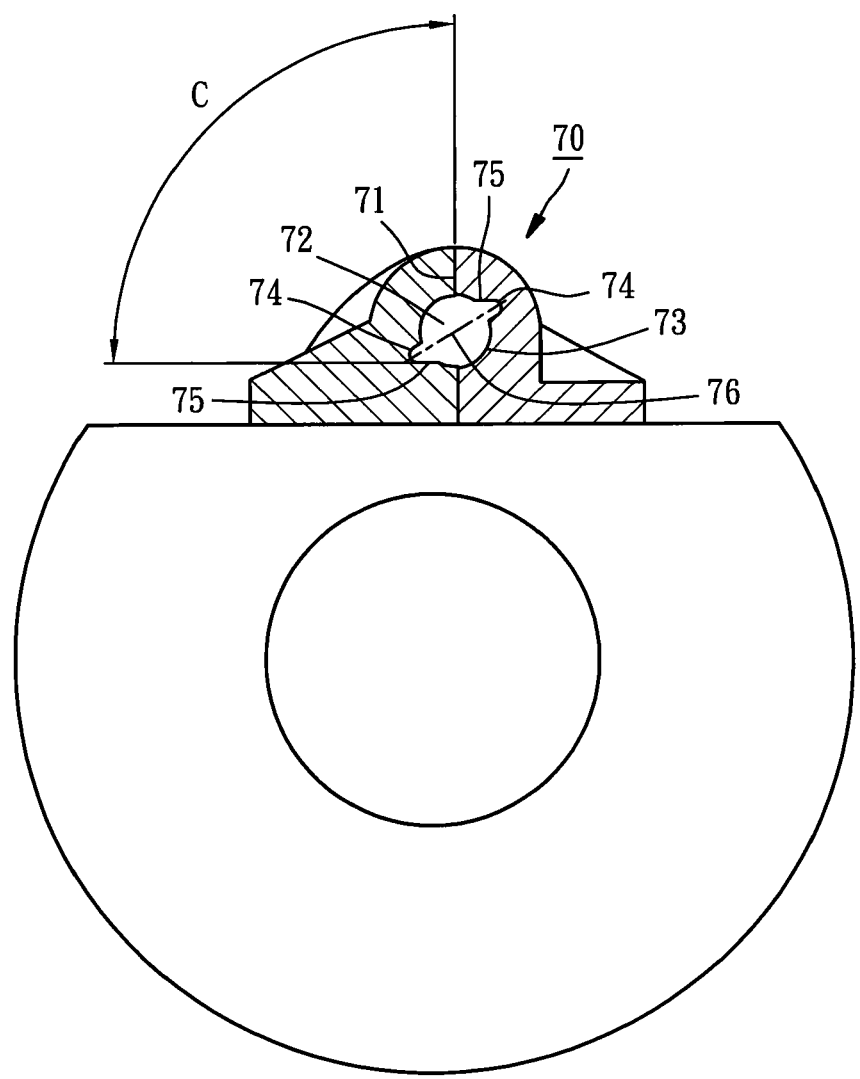
FIG. 11 is a sectional view of a second preferred embodiment of the present invention.

As shown in FIGS. 8-10, when the deflector 10 is mounted to the screw nut 62, the roller chain 50 and the rolling members 52 pass through the channel 30 and the roller chain 50 and rolling members 52 are internally circularly moved along the two second guide grooves 34 and the first guide groove 32 separately. The moving roller chain 50 can be deformably twisted or retroflexed subject to the curvature of the channel 30. Because the first wall 38 of the second guide groove 34 is not parallel to the extending axis 46 and the joint 19 and the commissure 22 define the predetermined angle B, the space formed by the first wall 38 extending toward the first guide groove is greater than that of the second wall 40. In this way, the roller chain 50 can be mounted to the second guide groove 34 by means of such feature of the first wall 38 to avoid excessive contact and friction with the internal wall of the second guide groove 34 while the roller chain 50 is moved, thus reducing and preventing tear and wear. The shape of the second guide groove 34 of the whole channel 30 allows the shape of the first wall 38 of different positions to coordinate with that of the moving roller chain 50 according to the deformation state of the ball screw 60, such that the roller chain 50 can be optimally moved to further prolong the service life of the roller chain 50.

In addition, the roller chain 50 is moved into and out of the channel 30 along the tangent of the spiral groove 63, such that the roller chain 50 and the rolling members 52 can be moved more smoothly. The channel 30 is formed by the combination of the main body 11 and the junction member 20; when the deflector 10 is made by plastic injection molding, the shape of the first wall 34 can disable the injection mold from structurally mold release and enable the deflector to be subject to mold release, thus decreasing the difficulty of mold design and production cost and increasing the production efficiency.

Although the deflector is mounted to the ball screw, the features of the present invention can also be applied to a linear guideway or an alternative linear transmission device having chains and rollers in need of endless movement.

Referring to FIG. 10, a deflector 70 in accordance with a second preferred embodiment of the present invention is similar to that of the first embodiment, having the following difference. The commissure 71 of the deflector 70 extends from its top side to its bottom side in such a way that the deflector 70 is formed by combination of two half molds. The channel 72 includes a first guide groove 73 and a second guide groove 74. The first wall 75 of the second guide groove 74 is not parallel to the extending axis 76 and defines an included angle C of 30-150 degrees with the commissure 71.

In light of the feature that the second guide groove of the aforesaid channel has two unsymmetrical walls, more space for deformation of the roller chain is available to decrease and prevent the roller chain from tear and wear, thus prolong the service life of the roller chain, decreasing the production cost, and increasing the production efficiency Although the present invention has been described with respect to specific preferred embodiments thereof, it is no way limited to the details of the illustrated structures but changes and modifications may be made within the scope of the appended claims.

What is claimed is:

1. A deflector for use in a ball screw, comprising a main body and a junction member, wherein each of the main body and the junction member has a joint or a commissure, the main body and the junction member being connected with each other along the joint and the commissure to form a channel therebetween, the channel having a first guide groove, two second guide grooves being formed at two opposite sides of the first guide groove respectively, each of the second guide grooves having a first wall and a second wall extending outward from the first guide groove, the first wall and the second wall having a conjunction formed therebetween, the channel having a vertical section defining an extending axis passing through centers of the two conjunctions, one of the first wall and the second wall of each second guide groove being not parallel to the extending axis, each of the first walls being symmetrically inclined toward two sides of the extending axis, an angle of inclination between each first wall and the extending axis being variable subject to different positions of the return path to make the sections of the second guide grooves variable in shape subject to different positions of the return path.

2. The deflector as defined in claim 1, wherein the main body comprises a base having a top side, a bottom side, a curviform convex portion formed at the top side, and a first cavity formed at the bottom side, the first cavity abutting against the convex portion and extending to the bottom side; the junction member comprises a second cavity and is mounted to the bottom side of the base in such a way that the first cavity and the second cavity form the channel.

3. The deflector as defined in claim 2, wherein the main body comprises two support portions mounted to a screw nut of the ball screw; the channel running through the midst of the two support members.

4. The deflector as defined in claim 1, wherein the first wall and the joint and the commissure define an included angle of 30-150 degrees therebetween.

5. The deflector as defined in claim 1, wherein the second wall and the joint and the commissure define an included angle of 90 degrees.

6. A ball screw having a deflector, comprising:
   a screw spindle having a spiral groove formed at an external periphery thereof;
   a screw nut having a spiral groove formed at an internal periphery thereof, a positioning portion being formed at an external periphery of the screw nut, the screw nut being sleeved onto the screw spindle; and
   a deflector having a main body and a junction member, each of the main body and the junction member having a joint or a commissure, the main body and the junction member being connected with each other along the joint and the commissure to form a channel therebetween, the channel having a first guide groove, two second guide grooves being formed at two opposite sides of the first guide groove respectively, each of the second guide grooves having two walls extending outward from the first guide groove, each two of the walls having a conjunction formed therebetween, the channel having a vertical section defining an extending axis passing through centers of the two conjunctions, at least one of the walls of each second guide groove being not parallel to the extending axis, each of the at least one of the walls being symmetrically inclined toward two sides of the extending axis, an angle of inclination between each of the at least one of the walls and the extending axis being variable subject to different positions of the return path to make the sections of the second guide grooves variable in shape subject to different positions of the return path.

7. The ball screw as defined in claim 6, wherein the channel defines an imaginary central axis, which is tangential to an external peripheral wall of the spiral groove of the screw nut, and communicates with the spiral groove.

8. The ball screw as defined in claim 6, wherein the main body comprises a base having a top side, a bottom side, a curviform convex portion formed at the top side, and a first cavity formed at the bottom side, the first cavity abutting against the convex portion and extending to the bottom side; the junction member comprises a second cavity and is mounted to the bottom side of the base in such a way that the first cavity and the second cavity form the channel.

9. The ball screw as defined in claim 6, wherein the main body comprises two support portions, the channel running through the midst of the two support portions, the two support portions being mounted through the screw nut to allow the channel to communicate with the spiral groove of the screw nut.

10. The ball screw as defined in claim 6, wherein the first wall and the joint and the commissure define an included angle of 30-150 degrees therebetween.

\* \* \* \* \*